United States Patent
Ramanathan et al.

(10) Patent No.: US 11,695,768 B1
(45) Date of Patent: Jul. 4, 2023

(54) SYSTEMS AND METHODS FOR LOCALLY CONDUCTING DELEGATED AUTHENTICATION AT EDGE NODES

(71) Applicant: Wells Fargo Bank, N.A., San Francisco, CA (US)

(72) Inventors: Ramanathan Ramanathan, Bellevue, WA (US); Chris Theodore Kalaboukis, San Jose, CA (US); Rameshchandra Bhaskar Ketharaju, Hyderabad (IN); Andres J. Saenz, Redmond, WA (US); Andrew J. Garner, IV, State Road, NC (US); Abhijit Rao, Irvine, CA (US); Joon Maeng, Newcastle, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 228 days.

(21) Appl. No.: 17/248,821

(22) Filed: Feb. 9, 2021

(51) Int. Cl.
*H04L 9/40* (2022.01)
*H04W 12/06* (2021.01)
*H04W 12/084* (2021.01)

(52) U.S. Cl.
CPC .......... *H04L 63/0884* (2013.01); *H04L 63/08* (2013.01); *H04L 63/0861* (2013.01); *H04W 12/06* (2013.01); *H04W 12/084* (2021.01)

(58) Field of Classification Search
CPC . H04L 63/0884; H04L 63/08; H04L 63/0861; H04W 12/06; H04W 12/084
See application file for complete search history.

(56) References Cited

U.S. PATENT DOCUMENTS

| | | | |
|---|---|---|---|
| 8,185,933 B1* | 5/2012 | Palmer | G06F 21/31 713/153 |
| 9,532,220 B2 | 12/2016 | Lee et al. | |
| 10,039,043 B2 | 7/2018 | Zhang et al. | |
| 10,142,342 B2 | 11/2018 | Seligson et al. | |
| 10,326,733 B2 | 6/2019 | Bokare et al. | |

(Continued)

OTHER PUBLICATIONS

Noll, Josef, et al., "5G: Service Continuity in Heterogeneous Environments", Wireless Pers Commun 57, (2011), 413-429.

(Continued)

*Primary Examiner* — Huan V Doan
(74) *Attorney, Agent, or Firm* — Schwegman Lundberg & Woessner, P.A.

(57) ABSTRACT

Disclosed herein are embodiments of systems and methods for locally conducting delegated authentication at edge nodes. In an embodiment, an edge node of a managed network receives, from an authentication system, authentication information for a user. The edge node stores the authentication information. The edge node receives, from a user device associated with the user, an authentication request that includes presented authentication information. The edge node determines whether one or more authentication criteria are met for the authentication request, and if so performs a set of authenticating operations. The one or more authentication criteria includes the presented authentication information matching the stored authentication information. The set of authenticating operations includes authenticating the user with respect to the managed network, as well as establishing an authenticated session for the user at the edge node.

18 Claims, 6 Drawing Sheets

(56) References Cited

U.S. PATENT DOCUMENTS

| | | | |
|---|---|---|---|
| 10,333,980 B2 | | 6/2019 | Ting et al. |
| 10,397,355 B2 | | 8/2019 | Hajj et al. |
| 2007/0256122 A1* | | 11/2007 | Foo .................... H04L 63/1433 726/5 |
| 2011/0041165 A1* | | 2/2011 | Bowen ............... H04L 63/0884 726/5 |
| 2016/0050234 A1* | | 2/2016 | Choyi .................... H04L 63/20 726/1 |
| 2017/0127276 A1* | | 5/2017 | Koo .................... H04L 63/0807 |
| 2017/0171178 A1 | | 6/2017 | Reynders |
| 2017/0223005 A1* | | 8/2017 | Birgisson ............. H04L 63/083 |
| 2017/0318452 A1 | | 11/2017 | Hahn et al. |
| 2018/0367314 A1* | | 12/2018 | Egner ................... H04L 9/3239 |
| 2019/0109816 A1 | | 4/2019 | Liu et al. |
| 2019/0246319 A1 | | 8/2019 | Lee et al. |
| 2019/0297669 A1 | | 9/2019 | Kawasaki et al. |
| 2020/0366677 A1* | | 11/2020 | Draznin ............. H04L 63/0853 |
| 2021/0144133 A1* | | 5/2021 | Allo .................... H04L 63/0428 |

OTHER PUBLICATIONS

Subils, Jean-Baptiste, "Authentication Via Multipie Associated Devices (thesis)", Scholar Commons, [Online], Retrieved from the Internet: <URL: https://scholarcommons.usf.edu/etd/5778/>, (Sep. 2015), 47 pgs.

* cited by examiner

SYSTEMS AND METHODS FOR LOCALLY CONDUCTING DELEGATED AUTHENTICATION AT EDGE NODES

TECHNICAL FIELD

Among other topics, the present disclosure relates to authentication, wireless communication, and edge computing, and more particularly to systems and methods for locally conducting delegated authentication at edge nodes.

BACKGROUND

Around the world, many people work in, attend, and/or are otherwise part of large, complex organizations such as multinational corporations, universities, financial-services institutions, engineering companies, tech companies, wireless-service providers, law firms, and so forth. These organizations often have many locations such as brick-and-mortar storefronts, corporate centers, corporate campuses, office buildings, and the like. Additionally, more people than ever are working and learning remotely-out of home offices, shared office spaces, coworking environments, etc., as well as while commuting, traveling, and so on. For these organizations, the increasing trends with respect to both their geographic footprint and their users' (e.g., employees') mobility brings increased complexity. Accordingly, these types of organizations often operate and manage large, complex information technology (IT) ecosystems for both internal operations and outward-facing (e.g., customer-facing) operations, among other purposes. Such ecosystems are examples of what are referred to herein as "managed networks." It is important to such organizations and their users (e.g., employees, customers, students, etc.) that these managed networks operate reliably, effectively, conveniently, and securely, among other desirable descriptors.

In today's modern society, for these types of organizations and many others, as well as for smaller organizations and individuals, there are many times in which it is important that a device, system of devices, network, and/or the like be able to validate (confirm, verify, etc.) that a given person (e.g., employee or other user) is who they assert to be, that a given device is the device that it asserts to be, and/or the like. The process of validating identities of people, devices, and the like is generally known as authentication. This is distinguished from, among other processes, authorization, which relates to controls over the particular resources to which a user and/or device, once authenticated, is granted access. As a general matter, and taking user authentication (as opposed to, e.g., device authentication) as an example, authentication can involve the presentation of one or more things that the user knows (e.g., a password, a personal identification number (PIN), an answer to one or more security questions, etc.), one or more things that the user has (e.g., an access card, a smart card, a particular mobile device, etc.), and/or one or more things that the user "is" (e.g., fingerprint, voiceprint, facial recognition, retinal scan, etc.), not to say that a fingerprint (as an example) represents the sum of a person, of course.

BRIEF DESCRIPTION OF THE DRAWINGS

A more detailed understanding may be had from the following description, which is presented by way of example in conjunction with the following drawings, in which like reference numerals are used across the drawings in connection with like elements.

FIG. 1 depicts an example communication context, which includes several example microcells, and in which one or more embodiments of the present disclosure could operate, be performed, and/or the like.

FIG. 4 depicts an example local communication context in which one or more embodiments of the present disclosure could operate, be performed, and/or the like.

DETAILED DESCRIPTION

Figure 1:
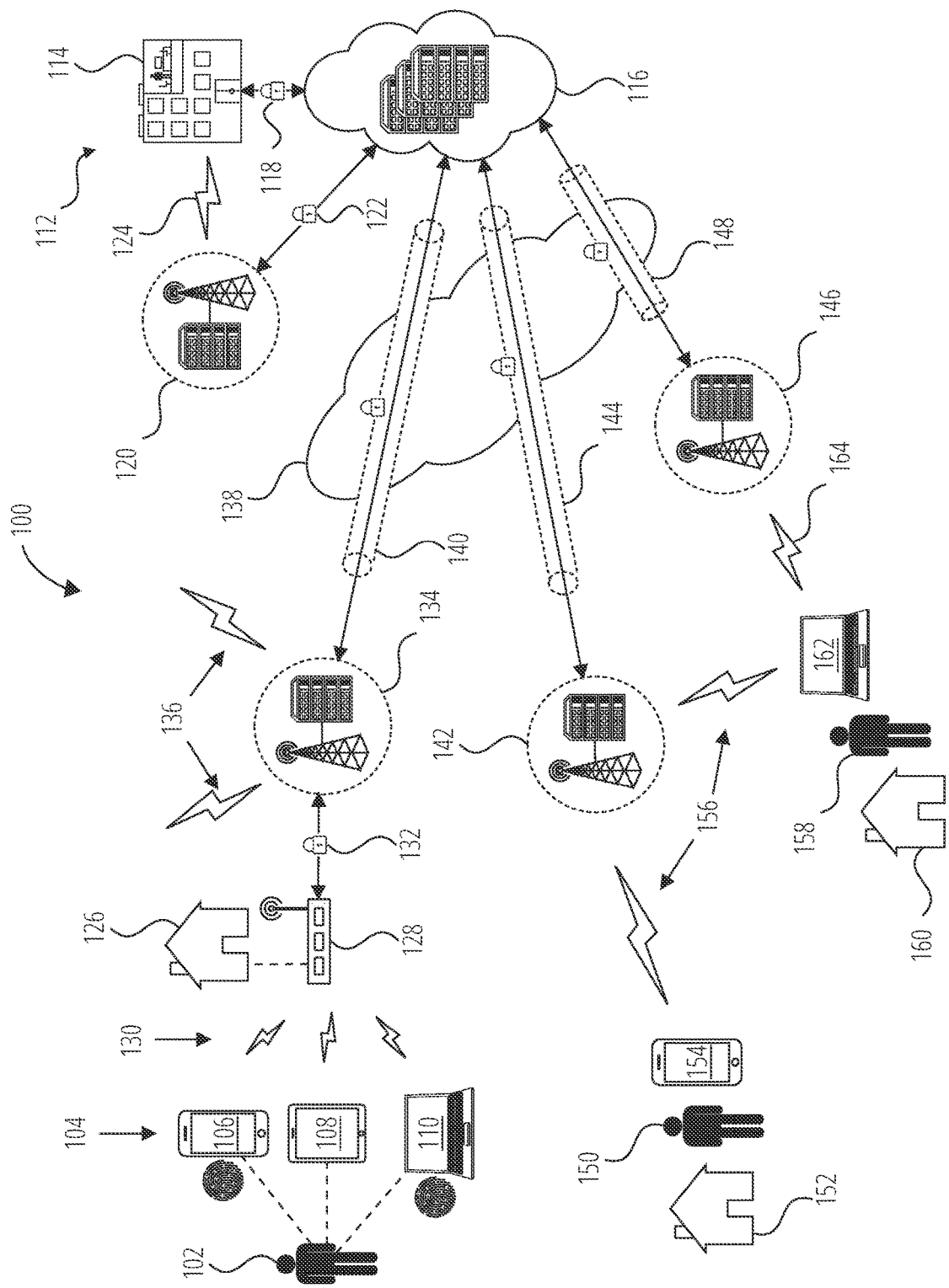

In the context of authentication, a number of different types of identifiers can come into play. In this disclosure, the terms "identity" and "identifier" are used somewhat interchangeably. As a general matter, however, as used herein, an identity is more of an ethereal, logical, and/or aggregate construct, whereas an identifier is a manifest representation of at least part (if not all) of an identity. In some cases, a digital identity of a person, a device, a person-and-device(s) combination, and/or the like includes a collection (e.g., concatenation) of multiple identifiers.

Some example types of identifiers include natural person identifiers (of which a given person typically has only one (e.g., social security number, driver's license in a particular U.S. state, passport number, etc.)), biometric identifiers (which are nearly always unique to a particular person), user identifiers (of which a given person can have one or more with respect to each of one or more organizations (e.g., employer), services (e.g., video-streaming services), and/or the like), and device identifiers (of which a given device generally has only one (of a given type)). There are a number of different types of device identifiers (e.g., hardware identifiers) such as serial number, electronic serial number (ESN), international mobile equipment identity (IMEI), media access control (MAC) address, wireless MAC address, integrated circuit card ID (ICCID), and the like. A given device (e.g., a server, desktop computer, mobile device, etc.) may house multiple instances of a given type of component device (e.g., Ethernet card, wireless-communication chipset, solid-state drive (SSD), and so forth), each of which may have its own unique hardware identifier.

In some cases, what is validated (or not) in connection with a given authentication attempt is a combination of multiple types of identifiers, such as a user identifier (e.g., username, international mobile subscriber identity (IMSI), etc.) together with a device identifier (e.g., IMEI) of, e.g., a trusted device that the person that is associated with the user identifier is authorized to use. Another example authentication instance may involve attempting to validate a combination of a biometric identifier (e.g., fingerprint) and a user identifier. In another example, an authentication instance may involve attempting to validate a combination of a user identifier together with the device identifiers of multiple devices (e.g., a user device such as a smartphone, a network access device such as a wireless access point, an upstream base station or server, and/or the like) that may be included in what is often referred to as a device chain. In such cases, the user associated with the user identifier may be specifically (e.g., singularly) authorized to use the user device, and may be among a pool of users authorized to communicate via the one or more other devices in the device chain. In other instances, the communication up the device chain may be authorized due to the fact that it begins with authorized communication from a trusted user device. Numerous other permutations could be listed here as well.

In one sense, a given digital identity or digital identifier of a natural person, user, device, and/or the like can be viewed as a stored set of one or more numbers, strings, tokens, and/or the like that represent various properties (features, characteristics, dimensions, etc.) that collectively uniquely identify a given person, user, and/or device, etc. In the case of a natural person identifier or a user identifier, a given digital identity may include both personally identifiable information (PII) and additional information. In connection with a given authentication attempt, whichever credentials are required and provided may be compared to a pre-stored instance of such credentials. If there is a perfect (or at least sufficient) match, a user and/or device may be authenticated (e.g., granted access to one or more authorized resources). If there is an insufficient match, a user and/or device may be denied access to resources or perhaps challenged to provide additional information, among other options. Numerous authentication workflows are possible.

One ongoing, seemingly ever-present threat to the continued reliable, effective, convenient, and secure operation of IT ecosystems—and indeed of many online systems and other resources—is the repeated attempts by nefarious actors to authenticate (e.g., log in, log on, etc.) to these systems, attempting in such instances to appear to be a valid, authorized user. These malicious authentication attempts are carried out by both people and programs (e.g., so-called "bots") that bad actors create or at least use. These attackers, including both people and bots, are persistent, and constantly adjust their attack strategies in an effort to circumvent defensive measures.

Bad actors often obtain lists of user identifiers (e.g., usernames). Accordingly, their attacks are often aimed at attempting to narrow down such lists to the user identifiers that are valid. They may attempt to authenticate to the given system using one or more of those user identifiers. As a result of these and other types of threats, IT teams, fraud-prevention teams, and others count among their goals to protect their respective ecosystems and/or other computing resources, communication resources, networks, and so forth against fraudulent authentication attempts, while at the same time striving to maintain reliable, highly available, and reassuringly secure access to those users that are making valid authentication attempts.

Among other inspirations and motivations, embodiments of the present disclosure arose in part from the realization and recognition that, increasingly, devices are becoming available and being deployed that are capable of multiple significant functions including both serving as an edge-computing device and providing wireless-communication service to one or more wireless client devices. Such devices are examples of what are referred to herein as "edge nodes" in that they operate on what those of skill in the art refer to as the "edge" of a given network. One example of such a device provides wireless-communication service according to fifth-generation (5G) standards, and is referred to herein as a "5G microcell."

In the present disclosure, the term "5G microcell" refers to the hardware, firmware, software, housing, and the like that collectively perform the operations that are described herein as being performed by a given 5G microcell. That term may be used elsewhere (e.g., in other writings and/or other contexts) to refer to the wireless coverage area of such a device. In this disclosure, however, a 5G microcell is the device (or system, etc.) itself, whereas its wireless coverage area is referred to herein as such, or as just its coverage area, etc. Any mention herein, however, of a given person and/or device (e.g., a mobile device) being "in" a given 5G microcell (and/or language to similar effect) is almost certainly a reference to that person and/or device being in the wireless coverage area of the microcell rather than inside the device itself.

Moreover, while it is the case that microcells are referenced frequently in this disclosure by way of example, embodiments of the present disclosure also apply to other types of cells as well, including other types of small cells, which is a term that encompasses microcells, femtocells, picocells, and the like. Small cells are often implemented in Long Term Evolution (LTE) networks, 5G networks, and the like as part of what is often referred to as a heterogeneous network (HetNet) approach, which involves what is known in the art as "layering" small cells and large cells in a given geographic area. Furthermore, while 5G networks and 5G microcells are the type of mobile networks and small cells that are primarily referenced and described herein, embodiments of the present disclosure also apply to other types of wireless networks (Wi-Fi, LTE, etc.) and other types of cells, including other types of small cells (picocells, femtocells, etc.).

Disclosed herein are embodiments of systems and methods for locally conducting delegated authentication at edge nodes. One embodiment takes the form of a method that is performed by an edge node of a managed network. The edge node receives, from an authentication system of the managed network, authentication information for each user in a subset of one or more users from among a plurality of users of the managed network. The authentication information includes a user segment specific to a user in the subset. The edge node stores the authentication information in data storage at the edge node. The edge node receives an authentication request from a user device. Both the authentication request and the user device are associated with the user. The authentication request includes presented authentication information. The edge node determines whether each of a set of one or more authentication criteria is met for the authentication request, and if so performs a set of authenticating operations responsive to the authentication request. The authentication criteria includes the presented authentication information matching the user segment of the stored authentication information. The set of authenticating operations includes authenticating the user with respect to the managed network, as well as establishing an authenticated session for the user at the edge node.

As described herein, one or more embodiments of the present disclosure take the form of methods that include multiple operations. One or more other embodiments take the form of systems that include at least one hardware processor and that also include one or more non-transitory computer-readable storage media containing instructions that, when executed by the at least one hardware processor, cause the at least one hardware processor to perform multiple operations (that in some embodiments do and in other embodiments do not correspond to operations performed in a herein-disclosed method embodiment). Still one or more other embodiments take the form of one or more non-transitory computer-readable storage media (CRM) containing instructions that, when executed by at least one hardware processor, cause the at least one hardware processor to perform multiple operations (that, similarly, in some embodiments do and in other embodiments do not correspond to operations performed in a herein-disclosed method embodiment and/or operations performed by a herein-disclosed system embodiment).

Furthermore, a number of variations and permutations of embodiments are described herein, and it is expressly noted that any variation or permutation that is described in this disclosure can be implemented with respect to any type of embodiment. For example, a variation or permutation that is primarily described in this disclosure in connection with a method embodiment could just as well or instead be implemented in connection with a system embodiment and/or a CRM embodiment. Furthermore, this flexibility and cross-applicability of embodiments is present in spite of any slightly different language (e.g., processes, methods, methodologies, steps, operations, functions, and/or the like) that is used to describe and/or characterize such embodiments and/or any element or elements thereof. Lastly, it is explicitly noted that, although often used as an abbreviation for the three-word phrase "computer-readable medium (or media)," "CRM" is used in this disclosure as an abbreviation for "one or more non-transitory computer-readable storage media."

FIG. 1 depicts a communication context 100 in which one or more embodiments of the present disclosure could operate, be performed, and/or the like. It should be understood that the communication context 100 is provided purely by way of example, as embodiments of the present disclosure can operate, be performed, and/or the like in numerous types of communication contexts having different numbers, types, and/or arrangements of devices, networks, and/or the like. As examples, there could be different types of user devices, different numbers of microcells, microcells that operate according to a wireless protocol other than what is discussed below by way of example, and/or the like.

Moreover, in different embodiments, one or more of the entities that are depicted in FIG. 1 could be distributed across multiple different components. Similarly, two or more of the entities that are depicted in FIG. 1 could be combined into fewer components. One or more functional aspects of any given entity could be realized as a standalone component and/or combined with one or more functional aspects of any one or more other entities. This flexibility with respect to distribution, centralization, and consolidation of functional aspects of the depicted entities also applies to the entities that are depicted in the other figures.

As shown in FIG. 1, a person 102 is associated by way of example with three user devices 104: a smartphone 106, a tablet 108, and a laptop 110. Any one or more other types of user devices 104 could be used instead of or in addition to one or more of the example user devices 104 that are depicted in FIG. 1. In the context of this disclosure, some example ways in which a person could be associated with a given user device include owning the device, subscribing to service for the device, leasing the device (from, e.g., a service provider), having been issued the device by an employer or other organization, and/or the like.

In at least one embodiment, a person being associated with a user device means, at a minimum, that that person (and perhaps one or more other people, but at least that person) is an authorized user of that device. Moreover, a fingerprint icon is displayed in FIG. 1 next to both the smartphone 106 and the laptop 110, indicating that, in this example, biometric authentication is an available option on each of those two user devices 104. And while a fingerprint icon is depicted by way of example, a given example of biometric authentication could include fingerprint authentication and/or one or more other types of biometric authentication (e.g., facial authentication, retinal authentication, voice authentication, etc.).

In the present example, the person 102 is an employee of an example company 112, which is depicted in FIG. 1 as having an office building 114 and a corporate network 116 that are communicatively connected with one another via a secure link 118. The depiction of the secure link 118 as being between the office building 114 and the corporate network 116 is for illustration, as any suitable part or parts of the corporate network 116 could be actually inside the office building 114 itself. In some embodiments, the corporate network 116 is or includes a private data network (e.g., a private Internet Protocol (IP) network). As the term is used herein, a secure link could be or include a communication link that is encrypted, that is physically isolated, that is physically protected, and/or the like. In this example scenario, the company 112 is also associated with a 5G microcell 120 that is communicatively connected with the corporate network 116 via a secure link 122. One or more user devices and/or other devices at the office building 114 may communicate with the 5G microcell 120 over an air interface 124. Instead or in addition, one or more devices at the office building 114 may communicate with the corporate network 116 via the secure link 118.

In the present disclosure, each 5G microcell is depicted using a circular icon that contains a "sub-icon" that represents a computing device (e.g., a server) communicatively connected to a sub-icon that represents a wireless transceiver. This depiction is symbolic in nature and is not intended to limit embodiments of the present disclosure to implementations in which a given 5G microcell includes two such separate entities joined together by a communication link, though that is certainly an option. Rather, the depiction of 5G microcells in this manner is meant to convey that, in at least one embodiment, a given 5G microcell not only includes the hardware and software for conducting 5G wireless communication with one or more other devices, but also includes sufficient computing resources (e.g., processor(s), memory, data storage, etc.) for the given 5G microcell to also function as an edge computing device, which is a term that is known to those of skill in the art. Furthermore, in spite of a same or similar (e.g., mirror-image) icon being used in this disclosure for each of the herein-described 5G microcells, two or more different types of 5G microcells could be used in a given communication context. Also, 5G is described herein by way of example and not limitation, as one or more other wireless-communication protocols, generations, and/or the like could be used instead of or in addition to 5G in a given implementation.

As depicted in FIG. 1, the person 102 lives in a house 126 in which a 5G router 128 has been deployed. The 5G router 128 could be (or include) a small cell (e.g., picocell) that provides a local air interface 130 that complies with 5G standards. In some embodiments, the 5G router 128 instead or in addition provides Wi-Fi service (e.g., 2.4 gigahertz (GHz) and/or 5 GHz Wi-Fi service) on the local air interface 130. The 5G router 128 may communicate with a 5G microcell 134 via a secure link 132, which could include wired communication and/or wireless (e.g., 5G) communication. In this example, the 5G microcell 134 provides 5G service on an air interface 136. As known to those of skill in the art, the combination of the 5G microcell 134, the secure link 132, the 5G router 128, and the local air interface 130 is an example of a "last mile" of communication service. This is a term that is often used to refer to whatever portion of a communication path to a given endpoint extends from the edge of a high-speed (e.g., fiber-optic) transport network to that endpoint. Some embodiments of the present disclosure involve providing a dedicated, non-shared last mile of service to various endpoints.

Furthermore, as depicted, the 5G microcell 134 is communicatively connected with the corporate network 116 by way of a secure tunnel 140, which traverses a public network 138. In various different examples, the public network 138 could be a data-communication network such as, including, or in communication with the Internet. Either or both of the corporate network 116 and the public network 138 could operate according to a suite of communication protocols such as the Transmission Control Protocol (TCP) over IP (TCP/IP), the User Datagram Protocol (UDP) over IP (UDP/IP), and/or the like. Any one or more of the secure tunnels described herein could be, include, or be part of a virtual private network (VPN), and could operate according to a secure tunneling protocol such as IP security (IPSec) or another suitable secure tunneling protocol. A secure tunnel could traverse a fiber-optic network for some or all of its communication between its two endpoints. In some embodiments, the 5G router 128 communicates (via, e.g., a secure tunnel (not depicted)) with the corporate network 116 via a communication path that does not include a 5G microcell. Other topologies are possible as well.

In the depicted example, the communication context 100 further includes two additional 5G microcells, though any number of 5G microcells could be deployed in a given implementation. A 5G microcell 142 is communicatively connected with the corporate network 116 via a secure tunnel 144, and a 5G microcell 146 is communicatively connected with the corporate network 116 via a secure tunnel 148. As depicted in this example, as is the case with the secure tunnel 140, both the secure tunnel 144 and the secure tunnel 148 traverse the public network 138. A second example person 150 is shown as having a house 152 and a smartphone 154, the latter of which is arranged in this example to be able to conduct 5G communication with 5G microcells in general, and in particular with the 5G microcell 142 over an air interface 156 in FIG. 1. Also depicted is a third example person 158 having a house 160 and a laptop 162, the latter of which is arranged in this example to be able to conduct 5G communication with 5G microcells, and is depicted by way of example in FIG. 1 as being in communication with both the 5G microcell 142 over the air interface 156 and with the 5G microcell 146 over an air interface 164.

In the communication context 100, all of the depicted 5G microcells are operated (at least in part) by the company 112. The company 112 could own the 5G microcells outright, lease them from another company, have contracted (with, e.g., a 5G service provider) to operate a standalone functional entity on one or more of the 5G microcells, and/or the like. All of these possibilities and other similar examples are subsumed within the notion of the company 112 "operating" the 5G microcells 120, 134, 142, and 146 as described in the present disclosure. Moreover, in a common geographical area, there could also be other 5G microcells operated by other organizations (e.g., companies, universities, hospitals, governmental entities, etc.). In a similar way, an organization other than the company 112 may be described herein as "operating" such 5G microcells regardless of the particular property or and/or contractual rights that that particular organization may have. In some cases, the company 112 and one or more other organizations may each be "operating" a 5G microcell on the same physical entity, where the communications that are particular to each organization are kept separate from one another. Furthermore, in some cases, a 5G service provider and the company 112 (and perhaps one or more other organizations) may each be "operating" a 5G microcell on the same physical entity. Those of skill in the art will understand the various arrangements that could be present in a given scenario.

Finally with respect to FIG. 1, it is noted that any of the devices, systems, and the like that are depicted in FIG. 1 and/or in any of the other figures could have a hardware architecture that is similar to the hardware architecture that is depicted in and described in connection with the example computer system 500 of FIG. 5, and could contain and execute software having a software architecture that is similar to the example software architecture 602 that is depicted in and described below in connection with FIG. 6. Moreover, any of the communication links (whether referred to or not in the present disclosure as a "secure communication link") that are depicted in FIG. 1 and/or in any of the other figures could be or include one or more wired-communication links (e.g., Ethernet, fiber optic, Universal Serial Bus (USB), and/or the like) and/or one or more wireless-communication links (e.g., Wi-Fi, 5G, LTE, near-field communication (NFC), Bluetooth, Bluetooth Low Energy, and/or the like). Furthermore, any one or more of the communication links could include one or more intermediate devices such as one or more routers, bridges, servers, access points, base stations, and/or the like. Additionally, any communication link could include one or more VPNs and/or other tunneling-type connections.

Figure 2:
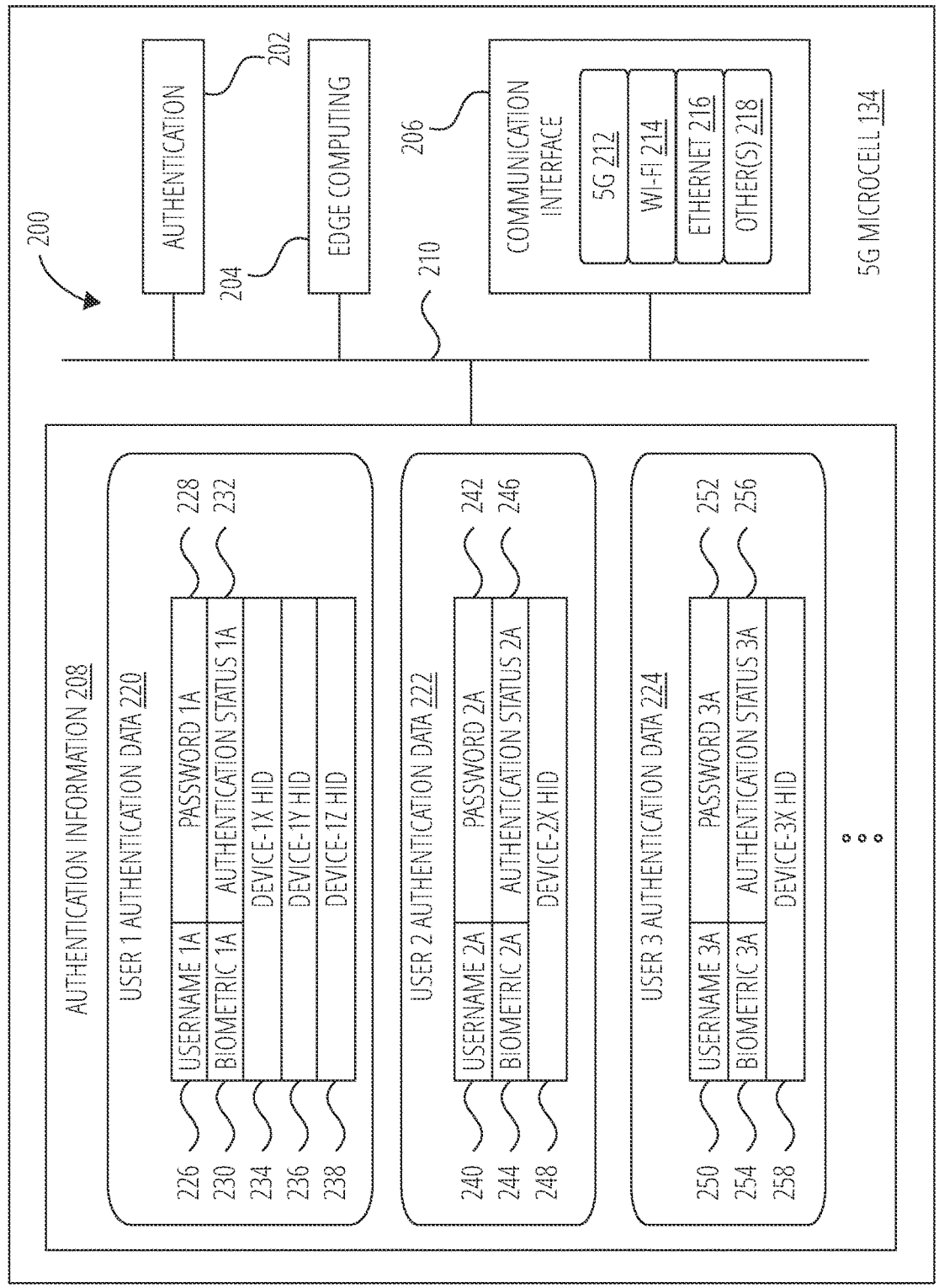
FIG. 2 depicts an example architecture of an example one of the microcells of FIG. 1, in accordance with at least one embodiment.

FIG. 2 depicts an example architecture 200 of the 5G microcell 134 of FIG. 1, in accordance with at least one embodiment. The 5G microcell 134 may be equipped, programmed, and configured to carry out various combinations of operations that are described herein. The architecture 200 is provided by way of example and not limitation, as different architectures could be implemented in different contexts. In the embodiment that is depicted in FIG. 2, the architecture 200 of the 5G microcell 134 includes an authentication module 202, an edge-computing module 204, a communication interface 206, and data storage (not separately numbered) containing authentication information 208, all of which are communicatively connected with one another via a system bus 210. These elements are discussed below.

The authentication module 202 may be arranged to perform the authentication-related operations that are described herein, including operations that are specifically referred to herein as "authenticating operations." As described below, the authentication module 202 may do so with reference to the authentication information 208 and at least in part by making use of processing resources of the 5G microcell 134, in addition to the communication interface 206. As described herein, computing devices such as the 5G microcell 134 may include one or more processors for executing instructions to cause the one or more processors to perform various operations.

The edge-computing module 204 may be arranged to provide edge-computing services to one or more client devices, processes, and/or the like. As is known to those of skill in the art, edge computing is a term that is often used to describe computing that is performed by one or more edge nodes of a given network. Edge nodes may be nodes that reside at (or on, or near, etc.) a virtual or logical boundary between (1) a cloud, a high-speed transport network, a secure tunnel, and/or the like on the one hand and (2) one or more instances of the "last mile" on the other, though edge nodes could also reside at one or more different boundaries and/or at different places in various topologies. One or more edge nodes are sometimes referred to as (or as being part of, or as being in, etc.) an "edge cloud."

As a general guideline but not a hard-and-fast rule, processes and storage that relate to so-called "big data" are often performed and/or reside in "the cloud" as that term is often used in the art (though by many definitions there is far more than one "cloud"), whereas the processes and (typically somewhat temporary) storage that are performed and/or provided "on the edge," "at the edge," "near the edge," by "edge devices," by "edge nodes," in "edge clouds," and so forth are typically related to smaller tasks, mobile tasks, mobile sessions, smaller sets of data, etc. Edge nodes often operate on what is sometimes referred to in the art as "instant data" in that it is data that is often collected and/or generated near and/or at the edge as well, perhaps by sensors, Internet of Things (IoT) devices, human users, etc. And while edge computing itself is not a new concept, recent advances in computing power, storage capacity, etc. of edge nodes (a.k.a. edge devices) have opened up a number of new possibilities.

The communication interface 206 may include any suitable set of one or more chipsets, antennae, other communication-related hardware, and/or the like for engaging in wireless communication with one or more other entities, including but not limited to providing wireless-communication service to one or more client devices. The communication interface 206 may also include hardware, ports, and the like for engaging in one or more types of wired communication, such as Ethernet (e.g., an Ethernet interface 216), USB, and the like. Returning to the wireless side, in at least one embodiment, the communication interface 206 includes a 5G interface 212 and a Wi-Fi interface 214. The 5G microcell 134 may utilize the 5G interface 212 to provide 5G service and may use the Wi-Fi interface 214 to provide Wi-Fi service. Finally, the communication interface 206 may include one or more other communication interfaces 218 that could be any mix of one or more wired-communication interfaces and one or more wireless-communication interfaces.

5G networks are often recognized by those in the art as providing (or at least having the potential to provide) relatively high data rates with relatively low latency, in addition to relatively high levels of availability and reliability, as compared with many other wireless-communication technologies. When used in accordance with the present disclosure, 5G networks can offer high security to customers, employees, and the like due to the implementation of a dedicated, non-shared last mile, as described herein. 5G also enables what is known as network slicing, virtualization, and the like, which leverages a common physical infrastructure to provide any number of virtual networks. This is what is described above, in connection with the communication context 100, regarding various different entities, organizations, etc. "operating" 5G microcells at times using shared hardware.

Also depicted in FIG. 2 is the example authentication information 208, which is described herein as being stored in data storage of the 5G microcell 134. As shown, the authentication information 208 may include authentication information for multiple different users, and in some cases for multiple different devices in connection with a given user. As described above, natural person identities are distinct from user identities. In the present disclosure, the persons 102, 150, and 158 are of course natural persons (i.e., human beings). In the balance of this description, those people are described as being associated with user identities "user 1," "user 2," and "user 3," respectively.

As described below, the authentication information 208 may include information for these user identities such as usernames, passwords, biometric identifiers, answers to security questions, authentication-status information, identifiers of validated devices (i.e., trusted devices), and/or the like. In the depicted-and-described example, the authentication information 208 includes authentication information for the aforementioned three user identities: user 1 (corresponding to the person 102), user 2 (corresponding to the person 150), and user 3 (corresponding to the person 158). In FIG. 2 itself and in this description thereof, these three sets of authentication information are respectively referred to as user-1 authentication data 220, user-2 authentication data 222, and user-3 authentication data 224.

As shown in FIG. 2, the user-1 authentication data 220 includes a username 1A 226, a password 1A 228, a biometric identifier 1A 230, an authentication status 1A 232, a device-1X HID 234, a device-1Y HID 236, and a device-1Z HID 238. In this example, the device-1X HID 234 corresponds to the smartphone 106 (considered "device 1X" in the user-1 authentication data 220), the device-1Y HID 236 corresponds to the tablet 108 ("device 1Y"), and the device-1Z HID 238 corresponds to the laptop 110 ("device 1Z"). The "HID" in each case is short for "hardware identifier."

Any one or more of those device identifiers could be of the type of any of those described above or any other suitable hardware identifier (or a combination of hardware identifiers, a combination of one or more hardware identifiers and one or more other data fields, etc.). The notation "1A" is used in connection with a number of the elements in the user-1 authentication data 220 (and similar notation for the other users) to represent the possibility that, e.g., in at least some embodiments, a given person could be associated with more than one username) in connection with the example IT ecosystem of the company 112. As an example, the person 102 could, in addition to being associated with the username 1A, also be associated with a username 1B, perhaps among others.

In connection with the person 150, the user-2 authentication data 222 includes a username 2A 240, a password 2A 242, a biometric identifier 2A 244, an authentication status 2A 246, and a device-2X HID 248, the latter of which may correspond to the smartphone 154 of the person 150. Similarly, though in this case in connection with the person 158, the user-3 authentication data 224 includes a username 3A 250, a password 3A 252, a biometric identifier 3A 254, an authentication status 3A 256, and a device-3X HID 258, the latter of which may correspond to the laptop 162 of the person 158. In various different embodiments, different types of fields could be stored for various different users. Any of the passwords 228, 242, and 252 could take on any suitable format. Any of the biometric identifiers 230, 244, and 254 could be any of the types of biometric identifiers described above and/or any other deemed suitable by those of skill in the art for a given implementation. Each of the authentication statuses 232, 246, and 256 may include information such as whether or not the corresponding user is currently authenticated, the last time that they were authenticated, the time remaining in their current authenticated session, the particular device with which they are currently authenticated, and/or the like.

Figure 3:
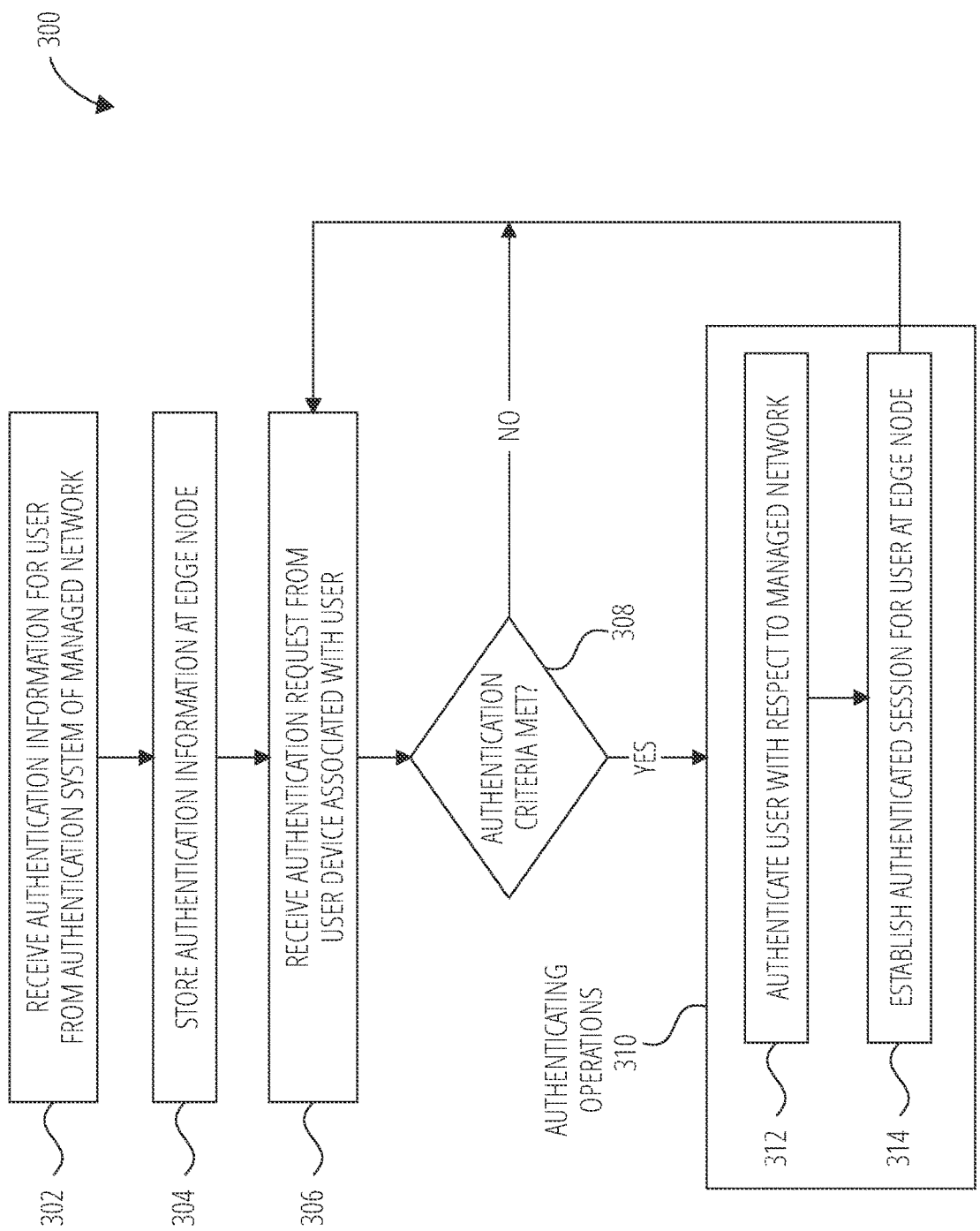
FIG. 3 depicts an example method, which may be performed by the example microcell of FIG. 2, in accordance with at least one embodiment.

FIG. 3 illustrates an example method, in accordance with at least one embodiment. As a general matter, the method 300 could be performed by any one or any combination of devices, systems, and/or the like that are programmed and/or otherwise arranged to perform the operations described herein. The method 300 can be performed by an edge node of a managed network, where each of the 5G microcells that are disclosed herein is an example of an edge node, and where the managed network could include the corporate network 116, the 5G router 128, and the 5G microcells 120, 134, 142, and 146, as well as the communication links (secure links, secure tunnels, etc.) by which the corporate network 116 and those various entities are communicatively connected. In other embodiments, "the company-112 managed network" is a reference to just the corporate network 116 and the 5G microcells 120, 134, 142, and 146. In the balance of this detailed description, that latter combination of entities is what is referred to herein as the "company-112 managed network." Other formulations of the elements in "the company-112 managed network" could be utilized in other embodiments.

By way of example and not limitation, the method 300 is described herein as being performed by the 5G microcell 134. In some embodiments, the 5G router 128 functions as an edge node as that term is used herein, and is arranged to perform the method 300. Furthermore, in some embodiments, as described more fully below, a user device (e.g., the smartphone 106, the smartphone 402, etc.) functions as an edge node and is arranged to perform the method 300. And certainly many other possibilities could be listed here as well and will occur to those of skill in the art having the benefit of this disclosure.

The method 300 begins at operation 302 with the 5G microcell 134 receiving, from an authentication system of the company-112 managed network, valid authentication information for each user in a subset of one or more users from among a plurality of users of the company-112 managed network. The referenced authentication system could be a central authentication system (residing in, e.g., the corporate network 116) for the entire company-112 managed network, or could be and/or reside in an entity that is upstream of the 5G microcell 134 and downstream of the corporate network 116 (such as an intermediate authentication server), an entity that is a peer or other edge node (e.g., a different 5G microcell) in the company-112 managed network, or another option deemed suitable by those of skill in the art for a given implementation.

The authentication information that is received at operation 302 may include the authentication information that is then stored (at operation 304) as the user-1 authentication data 220, and may also include the user-2 authentication data 222 and/or the user-3 authentication data 224. As described above, the user-1 authentication data 220 is a segment of the received authentication information that is specific to the aforementioned "user 1," which is a user identity that is associated in this disclosure with the person 102. As also described above, the 5G microcell 134 may be an edge node that includes both a wireless access node and an edge-computing device of the company-112 managed network.

In at least one embodiment, prior to receiving the authentication information at operation 302, the 5G microcell 134 itself is authenticated to the aforementioned authentication system of the company-112 managed network. This authentication process may be initiated by the corporate network 116, by the authentication system itself, by the 5G microcell 134, and/or by one or more other devices. Thus, in at least one embodiment, the 5G microcell 134 performs the method 300 as an authenticated ("trusted") device from the perspective of the company-112 managed network. In some embodiments, a network entity in the corporate network 116 may transmit authentication information to various different edge nodes based at least in part on the location of one or more user devices.

At operation 306, the 5G microcell 134 receives an authentication request from a user device, which in this example is the smartphone 106, which is associated with the person 102 and therefore with aforementioned user 1. The authentication request is also associated with user 1 by, e.g., including the username 1A 226 in the authentication request. In at least one embodiment, the authentication request includes what is referred to herein as "presented authentication information," which may include, in addition to the username 1A 226, the password 1A 228, the biometric identifier 1A 230, and/or the like. It is noted that the authentication request could be transmitted from the smartphone 106 to the 5G microcell 134 via a communication path that includes the local air interface 130, the 5G router 128, and the secure link 132, and could be formatted as a single message or as multiple messages.

The authentication request may also include the device-1X HID 234, which is associated with the smartphone 106. In some embodiments, the authentication request includes the username 1A 226 concatenated with the device-1X HID 234 (in either order—i.e., the device-1X HID 234 could be used as either a prefix or a suffix of the username 1A 226 (or other user identifier and/or natural person identifier) in the authentication request. In other embodiments, the authentication request includes a concatenation (again in either order) of the username 1A 226 (or other user identifier and/or natural person identifier) with a different serial number (or other number) that is generated at the smartphone 106, and that may be stored in a secure (e.g., substantially indestructible) memory module in the smartphone 106.

In some embodiments, the value that is used as a prefix or suffix to a user identifier or natural person identifier is generated by the 5G microcell 134 and provided by the 5G microcell 134 to the smartphone 106, in at least one embodiment as part of a handshaking process between the two. In some cases, such as in the context of a device chain, an identifier may be used for authentication that is a concatenation of such identifiers from multiple entities in the device chain. In various different embodiments and in various different instances, the sending of the authentication request from the smartphone 106 to the 5G microcell 134 could be at the initiation of either party, and in some cases may be in response to a user action such as attempting a login or continuing a previous session. In other cases, the authentication request may be sent programmatically in response to one or more types of triggering events such as user device being powered on, woken up, and/or the like.

At operation 308, the 5G microcell 134 determines whether each of a set of one or more authentication criteria is met for the authentication request that is received at operation 306. The set of one or more authentication criteria may include the presented authentication information (in the authentication request) matching the user-1 authentication data 220 (with respect to, e.g., one or more corresponding data fields). In various different examples, the presented authentication information may be checked for a match as to corresponding data in the user-1 authentication data 220 with respect to one or more user secrets (e.g., the password 1A 228), one or more biometric identifiers (e.g., the biometric identifier 1A 230), one or more hardware identifiers (e.g., the device-1X HID 234), and/or one or more other values deemed suitable by those of skill in the art for a given implementation. In some instances, the authentication criteria further includes a current location of the smartphone 106 being within a predefined location range. In other embodiments, location is used as a +/−(but not dispositive) factor with respect to authentication.

If it is determined at operation 308 that the set of one or more authentication criteria has not been met for the received authentication request, then control returns to operation 306 (or to a process that polls or waits for an authentication request to arrive, etc.). In other embodiments, one or more challenges for additional information may be executed prior to deciding that a given authentication attempt has failed. If, on the other hand, it is determined at operation 308 that the set of one or more authentication criteria has been met for the received authentication request, then the 5G microcell 134 proceeds to execute a set of authenticating operations 310 in response to the authentication request that was received at operation 306. As shown in FIG. 3, the authenticating operation 310 includes an operation 312 and an operation 314, each of which are described below, before control returns to operation 306 (or, again, to a process that polls or waits for an authentication request to arrive, etc.).

At operation 312, the 5G microcell 134 authenticates user 1 with respect to the company-112 managed network. Thus, in accordance with at least one embodiment, the 5G microcell 134 authenticates the smartphone 106 locally without reference to an authentication system further upstream, saving the associated user and user device in at least some examples from having to (perhaps repeatedly) authenticate all the way to a centralized authentication system. In a sense, the corporate network 116 (or one or more entities therein) has "deputized" the 5G microcell 134 such that the 5G microcell 134 is permitted to locally conduct such delegated authentication. To the extent a given one of a given user's user devices 104 needs to reauthenticate at a certain point, the fact that this is done locally by the 5G microcell 134 enhances the convenience for the user and in the aggregate also spares a more centralized authentication system from potentially becoming overloaded.

In general, the 5G microcell 134 may authenticate users (or user-plus-device combinations, etc.) with respect to the company-112 managed network for only a limited amount of time. Moreover, the 5G microcell 134 and other edge nodes may, in accordance with the present disclosure, set relatively long timeout periods before revoking the authenticated status of a given user device via that edge node. Conducting delegated authentication locally at the edge facilitates this, as the burden on a centralized server to authenticate and maintain longer sessions for an entire network of users would be too much to bear. This is especially the case in light of the fact that a significant number of users are associated with multiple user devices. In an embodiment, the first time a given user authenticates via a given edge node as described herein, the edge node may then store the username or other user identifier that is associated with the successful authentication attempt. The fact that this username is then cached at the edge node may be used as a factor to increase the likelihood and/or ease with which that same user can authenticate again in the future via that same edge node. In some embodiments, a timeout period for a given session has an inverse relationship with the sensitivity (e.g., confidentiality, monetary value, strategic value, personal nature, and/or the like) of the related data and/or operations performed during the session.

In at least one embodiment, the 5G microcell 134 (or other edge node) conducts authentication in such a manner as to revalidate a user as the user switches from using one device to another, where each of those devices are being served from an authentication perspective by the 5G microcell 134. In some embodiments, the 5G microcell 134 may, upon a user making a request that pertains to highly sensitive data, functionality, and/or the like, impose heightened authentication procedures on the user (or combination of user and device from which such a request was made, etc.) In such an instance, the 5G microcell 134 may communicate upstream with the authentication system of the company-112 managed network, which may issue a highly secure challenge via the 5G microcell 134 to the relevant user device. The 5G microcell 134 may also keep the relevant user device authenticated for a reduced period of time in such an instance. While the user is engaging with the sensitive data, functionality, etc., the 5G microcell 134 may send keepalive or similar messaging to the central authentication system so as to maintain the authenticated status with that central system of the user and particular device during that usage.

In general, embodiments of the present disclosure may employ any suitable combination of locally (i.e., edge-node) stored authentication criteria and centrally (or at least further upstream) stored authentication criteria for a given user, device, user-device combination, etc. In some cases, a central authentication system may provide a secret (e.g., numerical code) to the device using out-of-band (OOB) signaling (e.g., text message). Such a secret could be sent to (or generated by, using, e.g., an authenticator app, etc.) by the same device or another one of the user's devices. And certainly other permutations of these concepts could be used as well. Some such arrangements could be used for implementing features such as multiparty authentication, as an example.

In at least one embodiment, among a plurality of users (e.g., all users) of the company-112 managed network, it may be the case that permission to authenticate with respect to the company-112 managed network via a given edge node (e.g., the 5G microcell 134) is limited to a finite subset of one or more of that plurality of users. Moreover, it may instead or also be the case that a given edge node (e.g., the 5G microcell 134) is one of a finite group of one or more edge nodes via which one or more particular users (e.g., the person 102 (as user 1)) is permitted by the company-112 managed network to authenticate with respect to that managed network. This type of limitation could enhance security by making certain user devices only operable via certain edge nodes, in some cases via only one edge node. For example, it could be the case that the smartphone 106 can only connect to the company-112 managed network via the 5G microcell 134 (and perhaps only via the 5G router 128). Certainly many other types of such restrictions could be imposed in a given context.

At operation 314, the 5G microcell 134 may establish an authenticated session for user 1 at that edge node. It is recognized that operation 314 ("establish an authenticated session for user 1 at the 5G microcell 134") sounds somewhat similar to operation 312 ("authenticate user 1 with respect to the company-112 managed network"). And indeed, in many instances, there may be substantial—and some such cases complete-overlap between the two (i.e., in some cases, they may be one and the same). Such may be the case in a situation in which, for example, user 1 successfully authenticates at the 5G microcell 134 via the smartphone 106, proceeds to conduct an edge-computing session on the 5G microcell 134, and then logs off.

In other cases, however, the 5G microcell 134 may do just the first (i.e., operation 312) and not the second (i.e., operation 314), though both are listed as being performed in the example that is depicted in FIG. 3. It may be the case that the 5G microcell 134 authenticates the user-1-and-smartphone-106 combination to the company-112 managed network without opening a session for that combination on the 5G microcell 134. This may occur for relatively transient authentication events, such as for point-of-sale transactions and the like. In such situations, there may be value in considering the user-and-device combination (or user-and-device-chain combination, etc.) authenticated from the perspective of the company-112 managed network but not much value in maintaining a session for the authenticated combination when all that was being done was, e.g., paying for a tank of gas or the like.

In some embodiments, as part of the authenticating operations 310 and in particular in some embodiments with respect to operation 314 in particular, the 5G microcell 134 generates a session token (e.g., an encrypted session token) for the authenticated session that the 5G microcell 134 creates for the authenticated user-and-device combination. The 5G microcell 134 may then transmit that generated session token to the associated user device. In some cases, the session token includes a unique identifier (e.g., a hardware identifier) of the 5G microcell 134 itself. In some embodiments, a session token of this nature includes the associated user identity, an expiration time for the session, a hash (as an example) of a password and/or a biometric identifier, and/or the like.

In instances in which an authenticated session is to be handed over to another 5G microcell due to, e.g., movement of the associated user with the associated user device, that session token (e.g., in an encrypted form) may be transmitted by the 5G microcell 134 and/or the smartphone 106 to the target microcell. The target microcell may already have or may receive an appropriate decryption key (using, e.g., out-of-band (OOB) signaling, group-key-management techniques, and/or the like) so as to be able to decrypt and read the session token (and facilitate continuance of the session at the target microcell). In some cases, instead of or in addition to a session token, the 5G microcell 134 may pass what is referred to herein as a credential dataset for that session to at least one other authentication-requiring entity in the company-112 managed network. A given authentication-requiring entity could be a server (e.g., an authentication system) in the corporate network 116 or may be another microcell, among numerous other examples that could be listed here. And instead of or in addition to passing a credential dataset to an entity within the company-112 managed network, the 5G microcell 134 (or other edge node) and/or the smartphone 106 (or other user device) may transmit a credential dataset to an entity external to the company-112 managed network. As an example, the recipient of such a credential dataset could be a device, system, network, etc. of a trusted partner of the company 112.

In some instances, a credential dataset includes a generated session token. Moreover, in some instances, one or both of the session token and the credential dataset include an identifier of the edge node. Furthermore, in some instances, a credential dataset includes at least some of the user-1 authentication data 220 and/or at least some of the presented authentication information from the authentication request. Such information could be or include passwords, biometric identifiers, and/or the like. In some instances, the 5G microcell 134 (or other edge node) provides the smartphone 106 (or other user device) with a token, which may be a session token as described above, or may be a different token. Either way, in at least one embodiment, the smartphone 106 may be able to provide that token to one or more other entities that would then accept the smartphone 106 as being authenticated to the company-112 managed network. Such acceptance could be due in some cases to a numerical or other inherent property of the token itself. For example, a secret hash function executed by the receiving entity on the token may yield an expected (i.e., valid) result, confirming to the receiving entity the validity of the authentication of the smartphone 106 on the company-112 managed network.

Moreover, with reference to the "last mile" as discussed above, in some embodiments a secure tunnel is used along all or part of the last mile. In some cases, an edge node and a user device may have a shared memory so that these two entities could share information for creating a synchronous encryption tunnel between the two. This may involve utilization of homomorphic encryption, which is a type of encryption for which operations can be performed on data while it is still encrypted or after it has been decrypted, and either way produce a same output. This may also assist in facilitating multiparty transactions.

As described above and throughout this disclosure, there are a variety of different embodiments in which the edge node—that performs the method 300 and various permutations thereof—also functions as a wireless access node (e.g., a 5G microcell) for a wireless-communication network. Some embodiments of the present disclosure, however, take place on a smaller scale in a more geographically limited context. In general, however, the present disclosure contemplates embodiments in which the edge node serves any suitably sized geographic area and any number of user devices, whether by wired communication, wireless communication, or a combination of the two.. To present some illustrative embodiments, the reader's attention is now directed to FIG. 4, which depicts an example local communication context 400 in which one or more embodiments of the present disclosure could operate, be performed, and/or the like.

Figure 4:
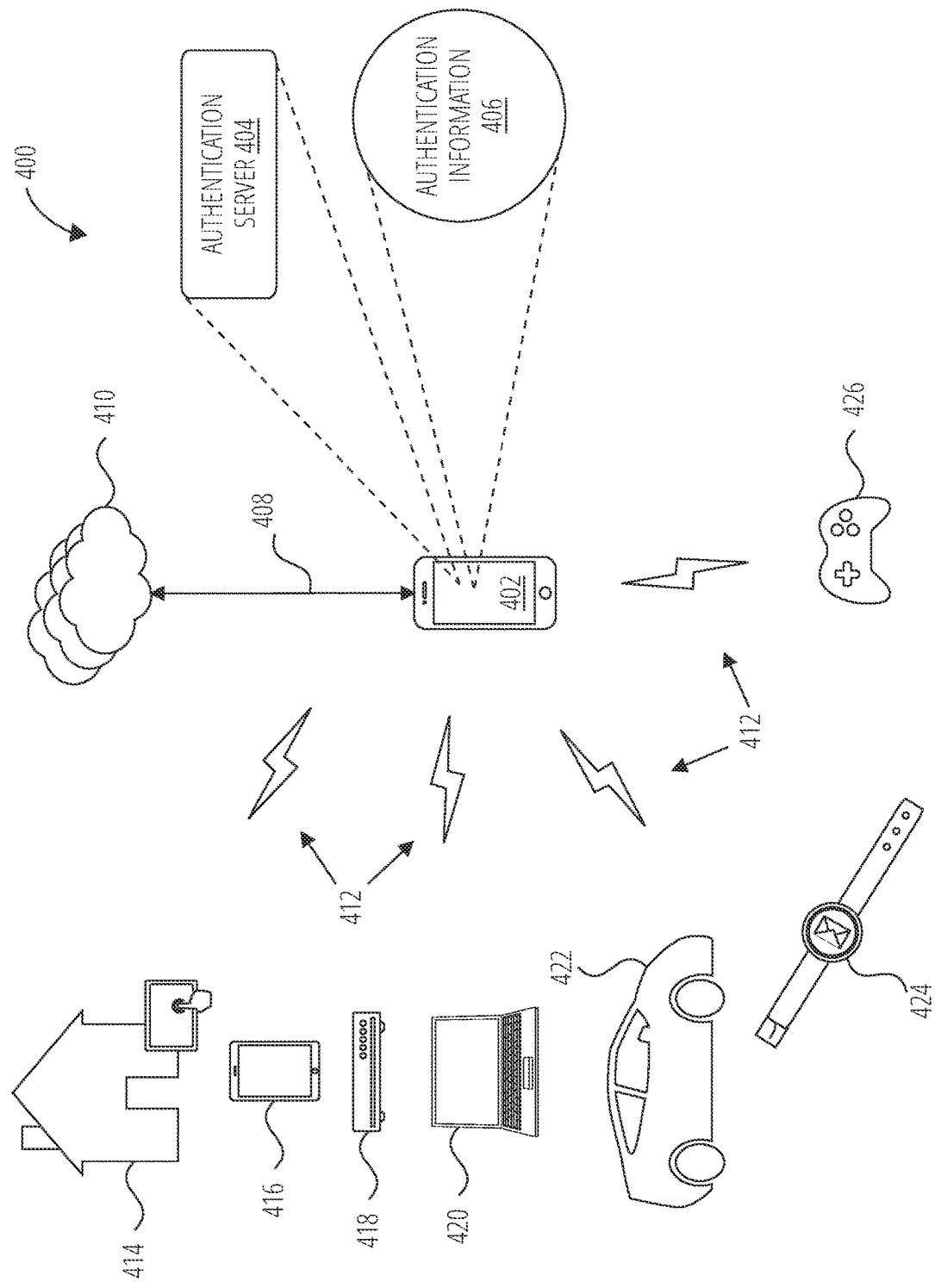

In FIG. 4, a smartphone 402 functions as the edge node (even though it is clearly also a user device) for providing an authentication service for various user devices 414-426. The number of user devices 414-426 that is depicted in FIG. 4 is not intended to indicate that all of them would be present at a given time, though of course that is possible. FIG. 4 is intended more as an illustrative diagram to show a number of different example types of user devices to which the smartphone 402, functioning at least in part as an edge node, could provide an authentication service in accordance with embodiments of the present disclosure.

The smartphone 402 is shown by way of example in FIG. 4 as including both an authentication server 404 and an authentication information 406. The authentication server 404 could be or include a hardware module dedicated to providing an authentication service, or could be implemented at least in part in software running on the smartphone 402. Thus, the authentication server 404 may utilize resources of the smartphone 402 such as an operating system, memory, processor(s), data storage, communication interface, and/or the like. Functionally, the authentication server 404 may be configured to perform the method 300 and/or one or more variants thereof.

Generally speaking, when comparing FIG. 1 to FIG. 4, FIG. 1 shows a situation in which, e.g., the 5G microcell 134 is functioning as the edge node and, e.g., the smartphone 106 is functioning as a user device 104 seeking authentication to the company-112 managed network via that edge node, whereas FIG. 4 depicts an example situation in which it is the smartphone 402 that is functioning as the edge node and the various other user devices 414-426 that may from time to time be seeking authentication to the company-112 managed network via that edge node. It is also contemplated that, for example, a 5G microcell could still be providing an authentication service for the smartphone 402 while at the same time the smartphone 402 is providing an authentication service for the other user devices 414-426. In other embodiments, it may be the case that the smartphone 402 acts as a relay for a given user device that is being provided an authentication service by, e.g., a 5G microcell in a situation in which the smartphone 402 is part of the device chain of which that user device is one end. That latter example is not the type of arrangement that is primarily discussed here with respect to FIG. 4, though it is certainly an option.

The examples that are primarily discussed here in connection with FIG. 4 involve the smartphone 402 providing an authentication service to one or more of the user devices 414-426. In some such cases, an intermediate edge node such as a 5G microcell also provides an authentication service to the smartphone 402; in other such cases, the smartphone 402 authenticates more directly with an entity in the corporate network 116. And certainly numerous other example topologies are possible upstream from the smartphone 402, though that upstream topology is not the focus of this discussion of FIG. 4. As such, the upstream portion beyond the smartphone 402 is depicted in FIG. 4 as just a communication link 408 to a set of one or more networks 410. The communication link 408 could function according to any communication technology deemed suitable by those of skill in the art for a given implementation. The one or more networks 410 could include one or more of the other networks discussed herein and/or one or more other networks.

Returning the discussion to the smartphone 402, the authentication information 406 could contain any suitable authentication information for any number of user devices. The authentication information 406 could be similar in content and arrangement to the authentication information 208, or could contain different data fields and/or be arranged in a different way. The smartphone 402 is depicted in FIG. 4 as communicating over an air interface 412 with the various user devices 414-426. The air interface 412 could involve communication via a local wireless protocol such as NFC, Bluetooth, RF, and/or the like. In some cases, the air interface 412 may involve Wi-Fi communication, either directly or via one or more access points, among other possible network topologies. Furthermore, in some instances, a first authentication of a given user device via the smartphone 402 may be by way of a wired (e.g., USB) connection.

In various different embodiments, it could be a same user or different users that are respectively associated with (i) a first user device (e.g., a mobile station other than the smartphone 402) that is being provided an authentication service and (ii) a second user device (e.g., the smartphone 402) that is providing that authentication service to the first user device. In the case of it being two different users, a given managed network could allow such arrangements between any two (or more) of its users, only between two users that are both in a designated subset of users associated with a given 5G microcell (or proximate topology of multiple 5G microcells, etc.) Such are design choices that can be made by those of skill in the art.

The user devices (other than the smartphone 402) that are depicted by way of example in FIG. 4 include a smart home 414, a tablet 416, a set-top box 418, a laptop 420, a smart car 422, a smart watch 424, and a video-game system 426 (represented by a single controller just for illustration). Other wearables (e.g., fitness trackers) besides or in addition to smartwatches could also be used in various different embodiments. Other such user devices that may be provided an authentication service by the smartphone 402 could include smart appliances, IoT devices, and/or the like. Those of skill in the art having the benefit of this disclosure will recognize that other user devices could be utilized as well. Moreover, as used herein a "smart car" could be any smart vehicle (e.g., any vehicle having computing and communication capabilities).

Furthermore, it is explicitly noted here that the "includes" relationship could be thought of as going in either direction as between (i) a given one of the various peripheral (and one or more other similar) user devices 414-426 that are depicted in FIG. 4 and (ii) the specific "user device" that may be provided an authentication service by, e.g., the smartphone 402. That is to say, it is equally valid to think of, e.g., the smart car 422 as including a specific device, module, component, etc. that serves as the "user device" that gets authenticated (or not) to a given network by the smartphone 402 on the one hand as it is to think on the other hand of the "user device" that gets authenticated (again, or not) to the given network by the smartphone 402 as being or including the smart car 422. This is viewed as a semantic distinction without much of a difference. Bottom line, in embodiments of the present disclosure, whether considering an arrangement such as is depicted in FIG. 1 (e.g., a 5G microcell or 5G router as the edge node providing an authentication service with respect to a larger network to a user device such as a smartphone or laptop), an arrangement such as that depicted in FIG. 4 (e.g., a user device such as a smartphone as the edge node providing an authentication service with respect to a larger network to a user device such as a smart car, smartwatch, etc.), or some other arrangement, a user device that is being provided such an authentication service can be included in, can be, or can include an entity such as a smart car, a smartwatch, etc.

An example is now described in which (i) the smart car 422 includes a user device that is seeking authentication on a given network and (ii) the smartphone 402 includes a user device that is arranged to provide such an authentication service. In some such examples, the smart car 422 may be a rental car that has been rented by the user of the smartphone 402 or by another user. Either way, the smartphone 402 may receive an authentication request from the smart car 422, validate that request, and accordingly authenticate the smart car 422 for at least a limited time with respect to the given network (in some cases establishing an authenticated session at the smartphone 402 for the smart car 422, in other cases not). As part of this process, the smartphone 402 may request authentication information related to the smart car 422 from one or more other entities (e.g., a server operated by the rental car company, a centralized authentication server to which authentication information regarding the rental car has been reported by the rental car company, etc.).

Thereafter, the smartphone 402 may receive, from the smart car 422, a request for an authenticated payment token for a transaction with a merchant (e.g., a gas station). In accordance with embodiments of the present disclosure, the smartphone 402 may generate the requested authenticated payment token, and may provide the (e.g., encrypted) requested authenticated payment token to one or both of the smart car 422 and the merchant. Thus, for at least a brief time, the smart car 422 is considered to be an authenticated device on, e.g., the company-112 managed network. And certainly this authenticated status could be leveraged for operations other than payment. For example, the smart car 422 could be enabled by the authentication to access one or more resources on the company-112 managed network (whether doing so via a communication path that includes the smartphone 402 or not), at least for a limited time. Certainly other utilizations of such an authenticated status will occur to those of skill in the art having the benefit of the present disclosure. Moreover, instead of or in addition to imposing an elapsed-time limit on a given authentication status, session, and/or the like, other types of limitations could be imposed such as a duration of a defined activity (e.g., a monitored activity), where some examples of such an activity include continuous movement, video engagement, voice engagement, and/or the like.

Figure 5:
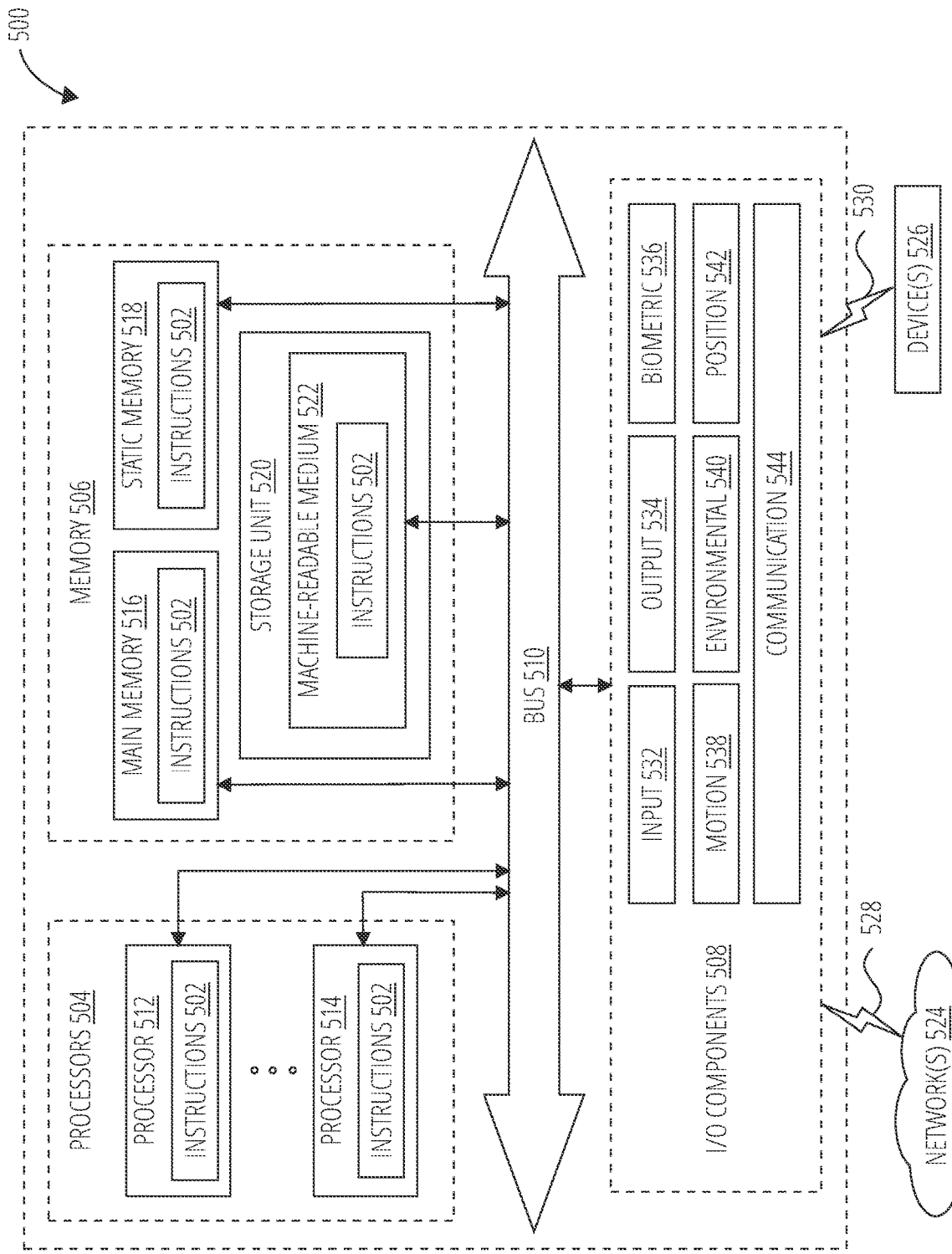
FIG. 5 depicts an example computer system, in accordance with at least one embodiment.

FIG. 5 illustrates an example computer system 500 within which instructions 502 (e.g., software, firmware, a program, an application, an applet, an app, a script, a macro, and/or other executable code) for causing the computer system 500 to perform any one or more of the methodologies discussed herein may be executed. In at least one embodiment, execution of the instructions 502 causes the computer system 500 to perform one or more of the methods described herein. In at least one embodiment, the instructions 502 transform a general, non-programmed computer system into a particular computer system 500 programmed to carry out the described and illustrated functions. The computer system 500 may operate as a standalone device or may be coupled (e.g., networked) to and/or with one or more other devices, machines, systems, and/or the like. In a networked deployment, the computer system 500 may operate in the capacity of a server and/or a client in one or more server-client relationships, and/or as one or more peers in a peer-to-peer (or distributed) network environment.

The computer system 500 may be or include, but is not limited to, one or more of each of the following: a server computer or device, a client computer or device, a personal computer (PC), a tablet, a laptop, a netbook, a set-top box (STB), a personal digital assistant (PDA), an entertainment media system, a cellular telephone, a smartphone, a mobile device, a wearable (e.g., a smartwatch), a smart-home device (e.g., a smart appliance), another smart device (e.g., an Internet of Things (IoT) device), a web appliance, a network router, a network switch, a network bridge, and/or any other machine capable of executing the instructions 502, sequentially or otherwise, that specify actions to be taken by the computer system 500. And while only a single computer system 500 is illustrated, there could just as well be a collection of computer systems that individually or jointly execute the instructions 502 to perform any one or more of the methodologies discussed herein.

As depicted in FIG. 5, the computer system 500 may include processors 504, memory 506, and I/O components 508, which may be configured to communicate with each other via a bus 510. In an example embodiment, the processors 504 (e.g., a central processing unit (CPU), a Reduced Instruction Set Computing (RISC) processor, a Complex Instruction Set Computing (CISC) processor, a graphics processing unit (GPU), a digital signal processor (DSP), an application-specific integrated circuit (ASIC), a radio-frequency integrated circuit (RFIC), another processor, and/or any suitable combination thereof) may include, as examples, a processor 512 and a processor 514 that execute the instructions 502. The term "processor" is intended to include multi-core processors that may include two or more independent processors (sometimes referred to as "cores") that may execute instructions contemporaneously. Although FIG. 5 shows multiple processors 504, the computer system 500 may include a single processor with a single core, a single processor with multiple cores (e.g., a multi-core processor), multiple processors with a single core, multiple processors with multiples cores, or any combination thereof.

The memory 506, as depicted in FIG. 5, includes a main memory 516, a static memory 518, and a storage unit 520, each of which is accessible to the processors 504 via the bus 510. The memory 506, the static memory 518, and/or the storage unit 520 may store the instructions 502 executable for performing any one or more of the methodologies or functions described herein. The instructions 502 may also or instead reside completely or partially within the main memory 516, within the static memory 518, within machine-readable medium 522 within the storage unit 520, within at least one of the processors 504 (e.g., within a cache memory of a given one of the processors 504), and/or any suitable combination thereof, during execution thereof by the computer system 500. In at least one embodiment, the machine-readable medium 522 includes one or more non-transitory computer-readable storage media.

Furthermore, also as depicted in FIG. 5, 110 components 508 may include a wide variety of components to receive input, produce and/or provide output, transmit information, exchange information, capture measurements, and/or the like. The specific I/O components 508 that are included in a particular instance of the computer system 500 will depend on the type of machine. For example, portable machines such as mobile phones may include a touch input device or other such input mechanisms, while a headless server machine may not include such a touch input device. Moreover, the I/O components 508 may include many other components that are not shown in FIG. 5.

In various example embodiments, the I/O components 508 may include input components 532 and output components 534. The input components 532 may include alphanumeric input components (e.g., a keyboard, a touchscreen configured to receive alphanumeric input, a photo-optical keyboard, and/or other alphanumeric input components), pointing-based input components (e.g., a mouse, a touchpad, a trackball, a joystick, a motion sensor, and/or one or more other pointing-based input components), tactile input components (e.g., a physical button, a touchscreen that is responsive to location and/or force of touches or touch gestures, and/or one or more other tactile input components), audio input components (e.g., a microphone), and/or the like. The output components 534 may include visual components (e.g., a display such as a plasma display panel (PDP), a light emitting diode (LED) display, a liquid crystal display (LCD), a projector, and/or a cathode ray tube (CRT)), acoustic components (e.g., speakers), haptic components (e.g., a vibratory motor, resistance mechanisms), other signal generators, and so forth.

In further example embodiments, the I/O components 508 may include, as examples, biometric components 536, motion components 538, environmental components 540, and/or position components 542, among a wide array of possible components. As examples, the biometric components 536 may include components to detect expressions (e.g., hand expressions, facial expressions, vocal expressions, body gestures, eye tracking, and/or the like), measure biosignals (e.g., blood pressure, heart rate, body temperature, perspiration, brain waves, and/or the like), identify a person (by way of, e.g., voice identification, retinal identification, facial identification, fingerprint identification, electroencephalogram-based identification and/or the like), etc. The motion components 538 may include accelerationsensing components (e.g., an accelerometer), gravitation-sensing components, rotation-sensing components (e.g., a gyroscope), and/or the like.

The environmental components 540 may include, as examples, illumination-sensing components (e.g., a photometer), temperature-sensing components (e.g., one or more thermometers), humidity-sensing components, pressure-sensing components (e.g., a barometer), acoustic-sensing components (e.g., one or more microphones), proximity-sensing components (e.g., infrared sensors, millimeter-(mm)-wave radar) to detect nearby objects), gas-sensing components (e.g., gas-detection sensors to detect concentrations of hazardous gases for safety and/or to measure pollutants in the atmosphere), and/or other components that may provide indications, measurements, signals, and/or the like that correspond to a surrounding physical environment. The position components 542 may include location-sensing components (e.g., a Global Navigation Satellite System (GNSS) receiver such as a Global Positioning System (GPS) receiver), altitude-sensing components (e.g., altimeters and/or barometers that detect air pressure from which altitude may be derived), orientation-sensing components (e.g., magnetometers), and/or the like.

Communication may be implemented using a wide variety of technologies. The I/O components 508 may further include communication components 544 operable to communicatively couple the computer system 500 to one or more networks 524 and/or one or more devices 526 via a coupling 528 and/or a coupling 530, respectively. For example, the communication components 544 may include a network-interface component or another suitable device to interface with a given network 524. In further examples, the communication components 544 may include wired-communication components, wireless-communication components, cellular-communication components, Near Field Communication (NFC) components, Bluetooth (e.g., Bluetooth Low Energy) components, Wi-Fi components, and/or other communication components to provide communication via one or more other modalities. The devices 526 may include one or more other machines and/or any of a wide variety of peripheral devices (e.g., a peripheral device coupled via a universal serial bus (USB) connection).

Moreover, the communication components 544 may detect identifiers or include components operable to detect identifiers. For example, the communication components 544 may include radio frequency identification (RFID) tag reader components, NFC-smart-tag detection components, optical-reader components (e.g., an optical sensor to detect one-dimensional bar codes such as Universal Product Code (UPC) bar codes, multi-dimensional bar codes such as Quick Response (QR) codes, Aztec codes, Data Matrix, Dataglyph, MaxiCode, PDF417, Ultra Code, UCC RSS-2D bar codes, and/or other optical codes), and/or acoustic-detection components (e.g., microphones to identify tagged audio signals). In addition, a variety of information may be derived via the communication components 544, such as location via IP geolocation, location via Wi-Fi signal triangulation, location via detecting an NFC beacon signal that may indicate a particular location, and/or the like.

One or more of the various memories (e.g., the memory 506, the main memory 516, the static memory 518, and/or the (e.g., cache) memory of one or more of the processors 504) and/or the storage unit 520 may store one or more sets of instructions (e.g., software) and/or data structures embodying or used by any one or more of the methodologies or functions described herein. These instructions (e.g., the instructions 502), when executed by one or more of the processors 504, cause performance of various operations to implement various embodiments of the present disclosure.

The instructions 502 may be transmitted or received over one or more networks 524 using a transmission medium, via a network-interface device (e.g., a network-interface component included in the communication components 544), and using any one of a number of transfer protocols (e.g., the Session Initiation Protocol (SIP), the HyperText Transfer Protocol (HTTP), and/or the like). Similarly, the instructions 502 may be transmitted or received using a transmission medium via the coupling 530 (e.g., a peer-to-peer coupling) to one or more devices 526. In some embodiments, IoT devices can communicate using Message Queuing Telemetry Transport (MQTT) messaging, which can be relatively more compact and efficient.

Figure 6:
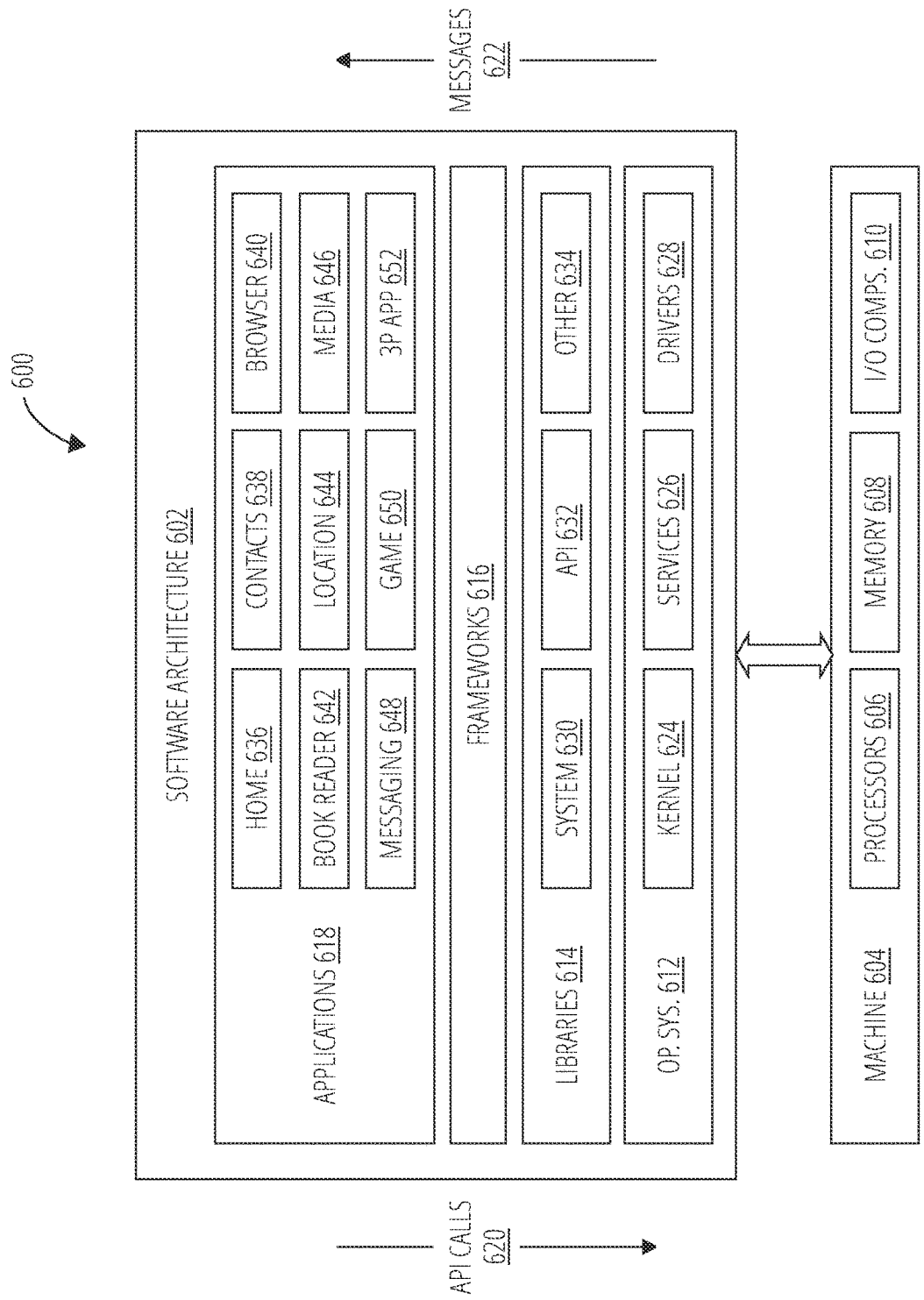
FIG. 6 depicts an example software architecture that could be executed on the example computer system of FIG. 5, in accordance with at least one embodiment.

FIG. 6 is a diagram 600 illustrating an example software architecture 602, which can be installed on any one or more of the devices described herein. For example, the software architecture 602 could be installed on any device or system that is arranged similar to the computer system 500 of FIG. 5. The software architecture 602 may be supported by hardware such as a machine 604 that may include processors 606, memory 608, and I/O components 610. In this example, the software architecture 602 can be conceptualized as a stack of layers, where each layer provides a particular functionality. The software architecture 602 may include layers such an operating system 612, libraries 614, frameworks 616, and applications 618. Operationally, using one or more application programming interfaces (APIs), the applications 618 may invoke API calls 620 through the software stack and receive messages 622 in response to the API calls 620.

In at least one embodiment, the operating system 612 manages hardware resources and provides common services. The operating system 612 may include, as examples, a kernel 624, services 626, and drivers 628. The kernel 624 may act as an abstraction layer between the hardware and the other software layers. For example, the kernel 624 may provide memory management, processor management (e.g., scheduling), component management, networking, and/or security settings, in some cases among one or more other functionalities. The services 626 may provide other common services for the other software layers. The drivers 628 may be responsible for controlling or interfacing with underlying hardware. For instance, the drivers 628 may include display drivers, camera drivers, Bluetooth or Bluetooth Low Energy drivers, flash memory drivers, serial communication drivers (e.g., USB drivers), Wi-Fi drivers, audio drivers, power management drivers, and/or the like.

The libraries 614 may provide a low-level common infrastructure used by the applications 618. The libraries 614 may include system libraries 630 (e.g., a C standard library) that may provide functions such as memory-allocation functions, string-manipulation functions, mathematic functions, and/or the like. In addition, the libraries 614 may include API libraries 632 such as media libraries (e.g., libraries to support presentation and/or manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), Portable Network Graphics (PNG), and/or the like), graphics libraries (e.g., an OpenGL framework used to render in two dimensions (2D) and three dimensions (3D) in graphic content on a display), database libraries (e.g., SQLite to provide various relational-database functions), web libraries (e.g., WebKit to provide web-browsing functionality), and/or the like. The libraries 614 may also include a wide variety of other libraries 634 to provide many other APIs to the applications 618.

The frameworks 616 may provide a high-level common infrastructure that may be used by the applications 618. For example, the frameworks 616 may provide various graphical-user-interface (GUI) functions, high-level resource management, high-level location services, and/or the like. The frameworks 616 may provide a broad spectrum of other APIs that may be used by the applications 618, some of which may be specific to a particular operating system or platform.

Purely as representative examples, the applications 618 may include a home application 636, a contacts application 638, a browser application 640, a book-reader application 642, a location application 644, a media application 646, a messaging application 648, a game application 650, and/or a broad assortment of other applications generically represented in FIG. 6 as a third-party application 652. The applications 618 may be programs that execute functions defined in the programs. Various programming languages may be employed to create one or more of the applications 618, structured in a variety of manners, such as object-oriented programming languages (e.g., Objective-C, Java, C++, etc.), procedural programming languages (e.g., C, assembly language, etc.), and/or the like. In a specific example, the third-party application 652 (e.g., an application developed using the ANDROID™ or IOS™ software development kit (SDK) by an entity other than the vendor of the particular platform) could be mobile software running on a mobile operating system such as IOS™, ANDROID™, WINDOWS® Phone, and/or the like. Moreover, a third-party application 652 may be able to invoke the API calls 620 provided by the operating system 612 to facilitate functionality described herein.

In view of the disclosure above, a listing of various examples of embodiments is set forth below. It should be noted that one or more features of an example, taken in isolation or combination, should be considered within the disclosure of this application.

Example 1 is a method performed by an edge node of a managed network, the method including: receiving, from an authentication system of the managed network, authentication information for each user in a subset of one or more users from among a plurality of users of the managed network, the authentication information including a first-user segment specific to a first user in the subset; storing the authentication information in data storage at the edge node; receiving a first authentication request from a first user device, both the first authentication request and the first user device being associated with the first user, the first authentication request including presented authentication information; and determining whether each of a set of one or more authentication criteria is met for the first authentication request, and if so then performing a set of authenticating operations responsive to the first authentication request, the set of one or more authentication criteria including the presented authentication information matching the first-user segment of the stored authentication information, the set of authenticating operations including authenticating the first user with respect to the managed network and further including establishing a first authenticated session for the first user at the edge node.

Example 2 is the method of Example 1, further including authenticating the edge node to the authentication system of the managed network prior to receiving the authentication information.

Example 3 is the method of either Example 1 or Example 2, where the edge node includes both a wireless access node and an edge-computing device of the managed network.

Example 4 is the method of any of the Examples 1-3, where a second user device includes the edge node.

Example 5 is the method of Example 4, where the second user device is also associated with the first user.

Example 6 is the method of Example 4, where the second user device is associated with a second user from among the plurality of users of the managed network.

Example 7 is the method of any of the Examples 1-6, where: a smart car includes the first user device; a mobile device includes the second user device; and the method further includes, subsequent to establishing the first authenticated session for the first user at the edge node: receiving, from the first user device, a request for an authenticated payment token for a transaction with a merchant; generating the requested authenticated payment token; and providing the requested authenticated payment token to one or both of the first user device and the merchant.

Example 8 is the method of any of the Examples 1-7, where: the first-user segment of the stored authentication information includes a user secret of the first user; and the presented authentication information matches the first-user segment of the stored authentication information only if the presented authentication information includes the user secret of the first user.

Example 9 is the method of any of the Examples 1-8, where: the first-user segment of the stored authentication information includes a biometric identifier of the first user; and the presented authentication information matches the first-user segment of the stored authentication information only if the presented authentication information includes the biometric identifier of the first user.

Example 10 is the method of any of the Examples 1-9, where: the first-user segment of the stored authentication information includes a hardware identifier of the first user device; and the presented authentication information matches the first-user segment of the stored authentication information only if the presented authentication information includes the hardware identifier of the first user device.

Example 11 is the method of any of the Examples 1-10, where the set of one or more authentication criteria further includes a location of the first user device being within a predefined location range.

Example 12 is the method of any of the Examples 1-11, where, among the plurality of users of the managed network, permission to authenticate with respect to the managed network via the edge node is limited to the one or more users in the subset.

Example 13 is the method of any of the Examples 1-12, where the edge node is one of a finite group of one or more edge nodes via which at least one of the one or more users in the subset is permitted by the managed network to authenticate with respect to the managed network.

Example 14 is the method of any of the Examples 1-13, where authenticating the first user with respect to the managed network includes authenticating the first user with respect to the managed network for a limited time.

Example 15 is the method of any of the Examples 1-14, where establishing the first authenticated session for the first user at the edge node includes establishing the first authenticated session for the first user at the edge node for a limited time.

Example 16 is the method of any of the Examples 1-15, where establishing the first authenticated session for the user at the edge node includes establishing the first authenticated session for an authenticated combination that includes the first user and the first user device.

Example 17 is the method of any of the Examples 1-16, where the set of authenticating operations further includes: generating a first session token for the first authenticated session; and transmitting the first session token to the first user device.

Example 18 is the method of any of the Examples 1-17, where the set of authenticating operations further includes passing a first credential dataset for the first authenticated session to at least one other authentication-requiring entity in the managed network, the first credential dataset identifying the first authenticated session.

Example 19 is an edge node of a managed network, the edge node including at least one hardware processor and one or more non-transitory computer-readable storage media containing instructions that, when executed by the at least one hardware processor, cause the at least one hardware processor to perform operations including: receiving, from an authentication system of the managed network, authentication information for each user in a subset of one or more users from among a plurality of users of the managed network, the authentication information including a first-user segment specific to a first user in the subset; storing the authentication information in data storage at the edge node; receiving a first authentication request from a first user device, both the first authentication request and the first user device being associated with the first user, the first authentication request including presented authentication information; and determining whether each of a set of one or more authentication criteria is met for the first authentication request, and if so then performing a set of authenticating operations responsive to the first authentication request, the set of one or more authentication criteria including the presented authentication information matching the first-user segment of the stored authentication information, the set of authenticating operations including authenticating the first user with respect to the managed network and further including establishing a first authenticated session for the first user at the edge node.

Example 20 is one or more non-transitory computer-readable storage media containing instructions that, when executed by at least one hardware processor of an edge node of a managed network, cause the at least one hardware processor to perform operations including: receiving, from an authentication system of the managed network, authentication information for each user in a subset of one or more users from among a plurality of users of the managed network, the authentication information including a first-user segment specific to a first user in the subset; storing the authentication information in data storage at the edge node; receiving a first authentication request from a first user device, both the first authentication request and the first user device being associated with the first user, the first authentication request including presented authentication information; and determining whether each of a set of one or more authentication criteria is met for the first authentication request, and if so then performing a set of authenticating operations responsive to the first authentication request, the set of one or more authentication criteria including the presented authentication information matching the first-user segment of the stored authentication information, the set of authenticating operations including authenticating the first user with respect to the managed network and further including establishing a first authenticated session for the first user at the edge node.

Further examples include apparatus, system, and non-transitory-computer-readable-storage-media embodiments of the method Examples 2-18.

To promote an understanding of the principles of the present disclosure, various embodiments are illustrated in the drawings. The embodiments disclosed herein are not intended to be exhaustive or to limit the present disclosure to the precise forms that are disclosed in the above detailed description. Rather, the described embodiments have been selected so that others skilled in the art may utilize their teachings. Accordingly, no limitation of the scope of the present disclosure is thereby intended.

As used in this disclosure, including in the claims, phrases of the form "at least one of A and B," "at least one of A, B, and C," and the like should be interpreted as if the language "A and/or B," "A, B, and/or C," and the like had been used in place of the entire phrase. Unless explicitly stated otherwise in connection with a particular instance, this manner of phrasing is not limited in this disclosure to meaning only "at least one of A and at least one of B," "at least one of A, at least one of B, and at least one of C," and so on. Rather, as used herein, the two-element version covers each of the following: one or more of A and no B, one or more of B and no A, and one or more of A and one or more of B. And similarly for the three-element version and beyond. Similar construction should be given to such phrases in which "one or both," "one or more," and the like is used in place of "at least one," again unless explicitly stated otherwise in connection with a particular instance.

Furthermore, in any instances in this disclosure, including in the claims, in which numeric modifiers such as "first," "second," "third," etc. are used in reference to components, data (e.g., values, identifiers, parameters, and/or the like), and/or any other elements, such use of such modifiers is not intended to denote or dictate any specific or required order of the elements that are referenced in this manner. Rather, any such use of such modifiers is intended to assist the reader in distinguishing elements from one another, and should not be interpreted as insisting upon any particular order or carrying any other significance, unless such an order or other significance is clearly and affirmatively explained herein.

Moreover, one or more components of one or more devices, systems, and/or the like may be referred to in this disclosure as "modules" that perform (execute, carry out, etc.) various operations. If and as used in the present disclosure, a "module" includes both hardware and instructions. The hardware could include one or more processors, one or more microprocessors, one or more microcontrollers, one or more microchips, one or more application-specific integrated circuits (ASICs), one or more field programmable gate arrays (FPGAs), one or more graphical processing units (GPUs), one or more tensor processing units (TPUs), and/or one or more devices and/or components of any other type deemed suitable by those of skill in the art for a given implementation. In some cases, a module includes at least one functional component (e.g., an application or part of an application, a block of code, and/or the like) executing in whole or in part on one or more hardware processors.

The instructions for a given module are executable by the hardware for carrying out the one or more herein-described operations of the module, and could include hardware (e.g., hardwired) instructions, firmware instructions, software instructions, and/or the like, stored in any one or more non-transitory computer-readable storage media deemed suitable by those of skill in the art for a given implementation. Each such non-transitory computer-readable storage medium could be or include memory (e.g., random access memory (RAM), read-only memory (ROM), erasable programmable read-only memory (EPROM), electrically erasable programmable read-only memory (EEPROM a.k.a. $E^2PROM$), Flash memory, and/or one or more other types of memory) and/or one or more other types of non-transitory computer-readable storage media. A module could be realized as a single component or be distributed across multiple components as deemed suitable by those of skill in the art for a given implementation.

Moreover, consistent with the fact that the entities and arrangements that are described herein, including the entities and arrangements that are depicted in and described in connection with the drawings, are presented as examples and not by way of limitation, any and all statements or other indications as to what a particular element or entity in a particular drawing or otherwise mentioned in this disclosure "is" or "has," and any and all similar statements that are not explicitly self-qualifying by way of a clause such as "In at least one embodiment," and that could therefore be read in isolation and out of context as absolute and thus as a limitation on all embodiments, can only properly be read as being constructively self-qualified by such a clause. It is for reasons akin to brevity and clarity of presentation that this implied clause is not repeated ad nauseum in this disclosure.

What is claimed is:

1. A method performed by an edge node of a managed network, the method comprising:
   receiving, from an authentication system of the managed network, authentication information for each user in a subset of one or more users from among a plurality of users of the managed network, the authentication information comprising a first-user segment specific to a first user in the subset;
   storing the authentication information in data storage at the edge node;
   receiving a first authentication request from a first user device, both the first authentication request and the first user device being associated with the first user, the first authentication request comprising presented authentication information, wherein a smart car comprises the first user device, a second user device comprises the edge node, and the second user device is a mobile device;
   determining whether each of a set of one or more authentication criteria is met for the first authentication request, and if so then performing a set of authenticating operations responsive to the first authentication request, the set of one or more authentication criteria comprising the presented authentication information matching the first-user segment of the stored authentication information, the set of authenticating operations comprising authenticating the first user with respect to the managed network and further comprising establishing a first authenticated session for the first user at the edge node; and
   subsequent to establishing the first authenticated session for the first user at the edge node:
      receiving, from the first user device, a request for an authenticated payment token for a transaction with a merchant;
      generating the requested authenticated payment token; and
      providing the requested authenticated payment token to one or both of the first user device and the merchant.

2. The method of claim 1, further comprising authenticating the edge node to the authentication system of the managed network prior to receiving the authentication information.

3. The method of claim 1, wherein the edge node comprises both a wireless access node and an edge-computing device of the managed network.

4. The method of claim 1, wherein the second user device is also associated with the first user.

5. The method of claim 1, wherein the second user device is associated with a second user from among the plurality of users of the managed network.

6. The method of claim 1, wherein:
   the first-user segment of the stored authentication information includes a user secret of the first user; and
   the presented authentication information matches the first-user segment of the stored authentication information only if the presented authentication information includes the user secret of the first user.

7. The method of claim 1, wherein:
   the first-user segment of the stored authentication information includes a biometric identifier of the first user; and
   the presented authentication information matches the first-user segment of the stored authentication information only if the presented authentication information includes the biometric identifier of the first user.

8. The method of claim 1, wherein:
   the first-user segment of the stored authentication information includes a hardware identifier of the first user device; and
   the presented authentication information matches the first-user segment of the stored authentication information only if the presented authentication information includes the hardware identifier of the first user device.

9. The method of claim 1, wherein the set of one or more authentication criteria further comprises a location of the first user device being within a predefined location range.

10. The method of claim 1, wherein, among the plurality of users of the managed network, permission to authenticate with respect to the managed network via the edge node is limited to the one or more users in the subset.

11. The method of claim 1, wherein the edge node is one of a finite group of one or more edge nodes via which at least one of the one or more users in the subset is permitted by the managed network to authenticate with respect to the managed network.

12. The method of claim 1, wherein authenticating the first user with respect to the managed network comprises authenticating the first user with respect to the managed network for a limited time.

13. The method of claim 1, wherein establishing the first authenticated session for the first user at the edge node comprises establishing the first authenticated session for the first user at the edge node for a limited time.

14. The method of claim 1, wherein establishing the first authenticated session for the user at the edge node comprises establishing the first authenticated session for an authenticated combination that includes the first user and the first user device.

15. The method of claim 1, wherein the set of authenticating operations further comprises:

generating a first session token for the first authenticated session; and transmitting the first session token to the first user device.

16. The method of claim 1, wherein the set of authenticating operations further comprises passing a first credential dataset for the first authenticated session to at least one other authentication-requiring entity in the managed network, the first credential dataset identifying the first authenticated session.

17. An edge node of a managed network, the edge node comprising:

at least one hardware processor; and one or more non-transitory computer-readable storage media containing instructions that, when executed by the at least one hardware processor, cause the at least one hardware processor to perform operations comprising:

receiving, from an authentication system of the managed network, authentication information for each user in a subset of one or more users from among a plurality of users of the managed network, the authentication information comprising a first-user segment specific to a first user in the subset;

storing the authentication information in data storage at the edge node;

receiving a first authentication request from a first user device, both the first authentication request and the first user device being associated with the first user, the first authentication request comprising presented authentication information, wherein a smart car comprises the first user device, a second user device comprises the edge node, and the second user device is a mobile device;

determining whether each of a set of one or more authentication criteria is met for the first authentication request, and if so then performing a set of authenticating operations responsive to the first authentication request, the set of one or more authentication criteria comprising the presented authentication information matching the first-user segment of the stored authentication information, the set of authenticating operations comprising authenticating the first user with respect to the managed network and further comprising establishing a first authenticated session for the first user at the edge node; and subsequent to establishing the first authenticated session for the first user at the edge node:

receiving, from the first user device, a request for an authenticated payment token for a transaction with a merchant;

generating the requested authenticated payment token; and providing the requested authenticated payment token to one or both of the first user device and the merchant.

18. One or more non-transitory computer-readable storage media containing instructions that, when executed by at least one hardware processor of an edge node of a managed network, cause the at least one hardware processor to perform operations comprising:

receiving, from an authentication system of the managed network, authentication information for each user in a subset of one or more users from among a plurality of users of the managed network, the authentication information comprising a first-user segment specific to a first user in the subset;

storing the authentication information in data storage at the edge node;

receiving a first authentication request from a first user device, both the first authentication request and the first user device being associated with the first user, the first authentication request comprising presented authentication information, wherein a smart car comprises the first user device, a second user device comprises the edge node, and the second user device is a mobile device;

determining whether each of a set of one or more authentication criteria is met for the first authentication request, and if so then performing a set of authenticating operations responsive to the first authentication request, the set of one or more authentication criteria comprising the presented authentication information matching the first-user segment of the stored authentication information, the set of authenticating operations comprising authenticating the first user with respect to the managed network and further comprising establishing a first authenticated session for the first user at the edge node; and subsequent to establishing the first authenticated session for the first user at the edge node:

receiving, from the first user device, a request for an authenticated payment token for a transaction with a merchant;

generating the requested authenticated payment token; and providing the requested authenticated payment token to one or both of the first user device and the merchant.

* * * * *